United States Patent [19]

Derfiny

[11] Patent Number: 5,073,000
[45] Date of Patent: Dec. 17, 1991

[54] OPTICAL INTERCONNECT PRINTED CIRCUIT STRUCTURE

[75] Inventor: Dennis Derfiny, Clarendon Hills, Ill.

[73] Assignee: Motorola, Inc., Schaumburg, Ill.

[21] Appl. No.: 526,197

[22] Filed: May 21, 1990

[51] Int. Cl.$^5$ ............................................. G02B 6/10
[52] U.S. Cl. ...................................... 385/14; 385/49; 385/88
[58] Field of Search ............... 350/96.12, 96.15, 96.20

[56] References Cited

U.S. PATENT DOCUMENTS

| | | | |
|---|---|---|---|
| 4,755,017 | 7/1988 | Kapany | 350/96.15 |
| 4,762,386 | 8/1988 | Gordon et al. | 350/96.15 X |
| 4,818,056 | 4/1989 | Enochs et al. | 350/96.15 X |
| 4,834,492 | 5/1989 | Ishii et al. | 350/96.15 X |
| 4,844,581 | 7/1989 | Turner | 350/96.15 X |
| 4,988,157 | 1/1991 | Jackel et al. | 350/96.20 X |

Primary Examiner—William L. Sikes
Assistant Examiner—Phan T. Heartney
Attorney, Agent, or Firm—Jon P. Christensen

[57] ABSTRACT

A digital inter and intra printed circuit board communication system wherein high speed data transfers occur using fiber optics signals. Ease of connection of the fiber optics wave-guides is facilitated through the use of wave-guides embedded with the circuit board and through the use of fiber optics edge connectors.

11 Claims, 2 Drawing Sheets

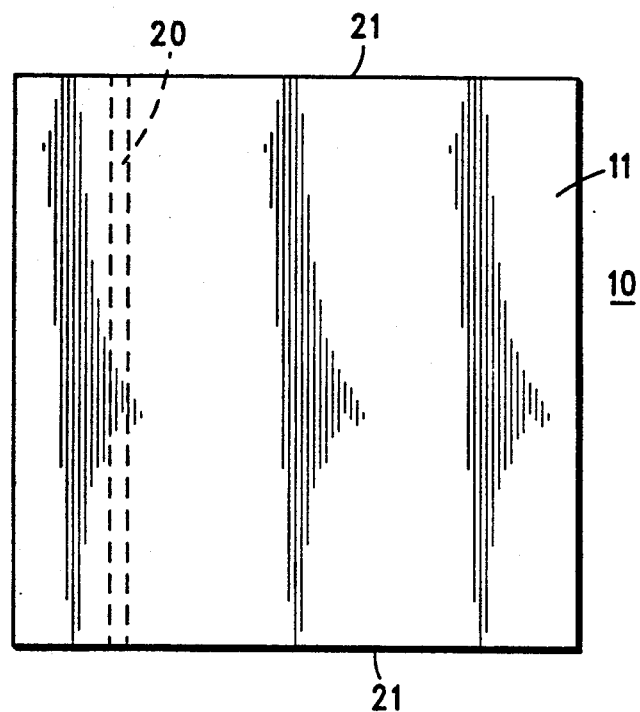
FIG. 1B
FIG. 1A
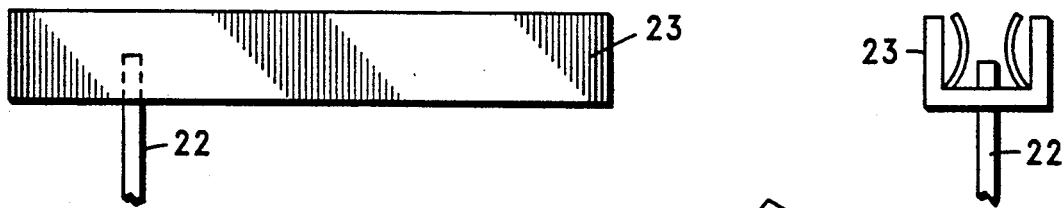
FIG. 1C
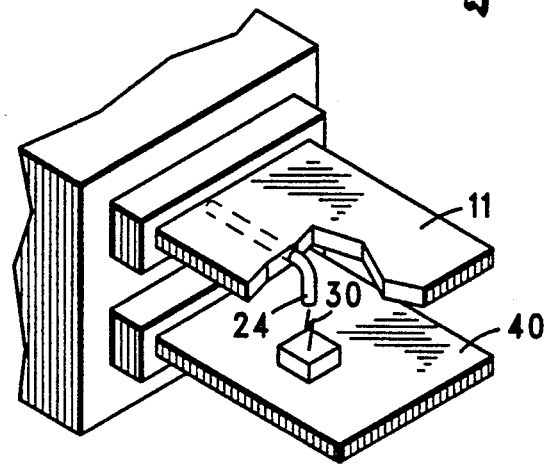
FIG. 2
FIG. 3
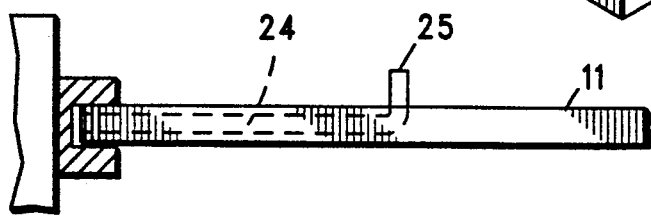

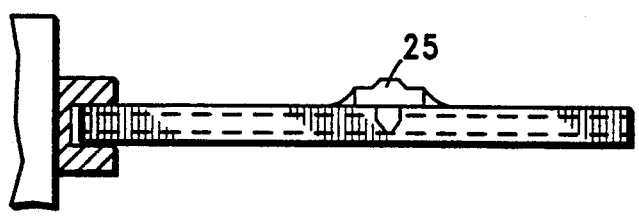
FIG.4
FIG.5
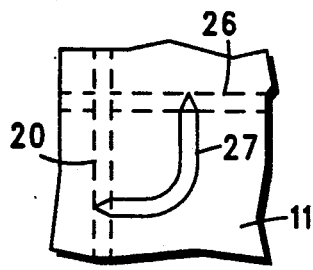
FIG.6
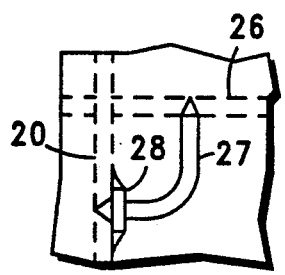
FIG.7
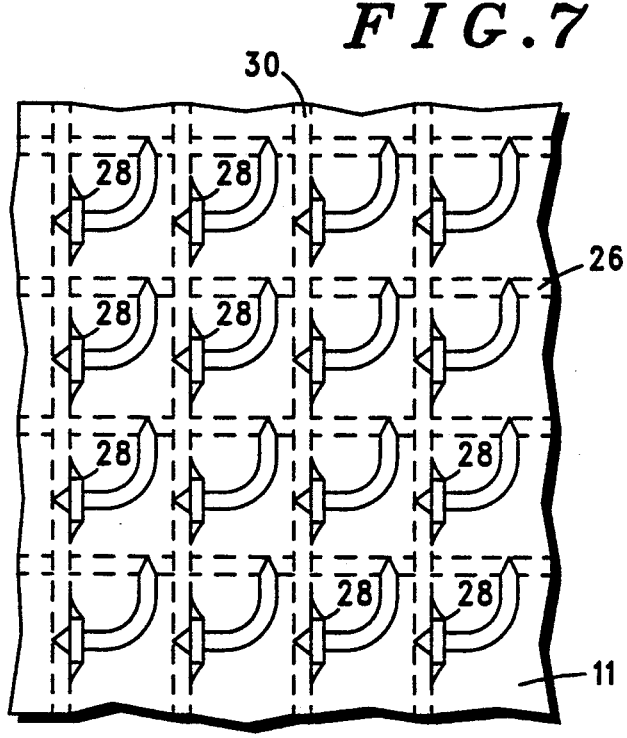
FIG.8
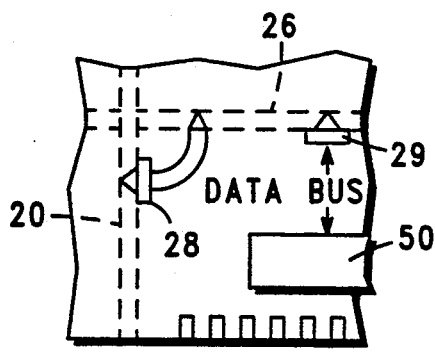
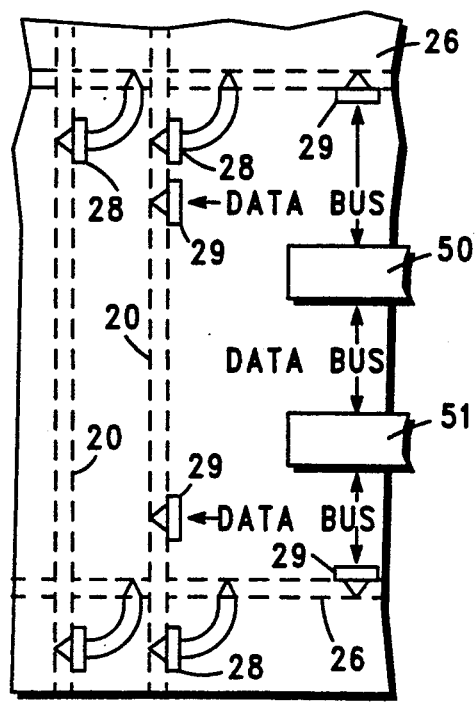
FIG.9

OPTICAL INTERCONNECT PRINTED CIRCUIT STRUCTURE

TECHNICAL FIELD

This invention relates generally to the field of high-speed communication systems and more specifically to data communication systems.

BACKGROUND OF THE INVENTION

High speed communication systems are known. Such systems typically use copper wires and transmit signals using electrical impulses transmitted over wires. While the system has worked well the evolution of data processing hardware has introduced drawbacks associated with the use of wire-based digital communication systems.

As time has passed competition between producers of data processing equipment has resulted in a need to reduce prices by increasing speed of and reducing the size and parts-count of components included in data processing devices. The increased speed has resulted in problems associated with high frequency communications including stray capacitances and inductances. The further the transmission distance the greater the problems. In general most wire-based data communication systems operate at maximum speed for any given application under current technology.

Reducing the size of digital processing devices has also exacerbated the problem of digital communication systems. The reduced size has resulted in the location of devices in closer proximity than previously experienced and has therefore created additional problems with heat and further electromagnetic interference.

One solution to these problems has been to use fiber optics communication devices, Fiber optics, as is well known in the art, offer extremely high speed communications while generating virtually no interference. Fiber optics devices, on the other hand, suffer from the difficulty of bulky connection devices. The bulky devices have been necessary because of the criticality of alignment between fiber optics wave-guides. Further problems include difficulty in routing optical signals to multiple destinations without first converting from an optical to an electric signal. It is the intent of the subject invention to provide a apparatus and a method to solve these problems in the use of optical communication systems.

SUMMARY OF THE INVENTION

Pursuant to one embodiment of this invention data processing modules are constructed with fiber optics wave-guides embedded within the supporting structure of the module. Connections are made between the module and the remainder of the data processing system through the use of fiber optics [edge-]connectors. The fiber optics edge connector provide a convenient method of automatically aligning the ends of the fiber optics wave-guide through insertion of the substrate into the connector. Fiber optics connectors solve the time-consuming problem of establishing connections at the module level in a convenient, space-efficient manner and allow for the rapid assembly or repair of fiber-optics-based communications systems.

Problems of making connections within the module are solved by either routing the wave-guide directly to the desired device destination and terminating using conventional components or through the use of fiber optics taps and switches. FIber optics taps, as known in the art, are connections made with the wave-guide allowing a portion of the optical signal to be split-off from the signal present in the original wave-guide and transmitted into a second wave-guide while a portion of the optical signal passes through the tap location into the remaining portion of the orignal wave-guide. Fiber optics taps allow an optical signal to be applied to a number of devices simultaneously.

The functioning of fiber optics taps may be understood by reference to a light beam traveling within a wave-guide and striking the end of the wave-guide, cut at a forty-five degree angle. Part of the light beam will be reflected within the wave-guide at an angle normal to the incident beam. The remainder of the beam will be transmitted through the cut end in line with the incident beam.

When the cut face of the second wave-guide (with an end also cut at forty-five degrees) is aligned with the cut face of the first wave-guide such that the axis of the first wave-guide is normal to the axis of the second wave-guide, and a light beam is passed into the first wave-guide, the light beam will strike the aligned forty-five degree cuts and a portion of the light beam will be transmitted in the second wave-guide parallel to the axis of the second wave-guide.

When a V-shaped cut is made in a first wave-guide (each side cut at forty-five degrees to the axis of the wave-guide), and a second wave-guide with its tip shaped to fit the V-shaped cut (a tap) is inserted into the V-shaped cut then a light beam traveling along the axis of the first wave-guide ahead of the tap will be partially reflected into the second wave-guide. The remainder of the light beam will continue to travel, past the tap, down the first wave-guide.

Fiber optics switches are piezoelectric devices used to tranmit or block the transmission of optical information along a wave-guide and are known in the art. A piezoelectric switch is constructed in a manner similar to an optical tap except the V-shaped insert of the tap is coated with a piezoelectric material having the capacity to turn opague upon application of an electric potential thereby permitting a selective switching of an optical signal (becomes an optic switch). The fiber optic switch is inserted into and becomes a part of the wave-guide. When the fiber optic switch is deactivated the fiber optic wave-guide performs as if the switch were not present permitting re-transmision of the optical signal into the waveguide on an output side of the switch. Application of an electrical signal to the switch causes the fiber optic switch to become opaque and to block either all optical signals or only signals of certain specific wave-lengths depending upon the composition of the piezoelectric material.

BRIEF DESCRIPTION OF THE DRAWINGS

FIGS. 1a-1c comprises a substrate assembly showing one wave-guide within the subtrate and a fiber optic edge connector. FIG. 2 comprises a substrate assembly and a conventional digital signal processing board wherein the substrate assembly is transmitting an optical signal to the adjacent board.

FIG. 3 comprises one method of transmitting an optical signal to an adjacent conventional signal processing circuit board.

FIG. 4 comprises a second method of transmitting an optical signal to an adjacent conventional signal processing board.

FIG. 5 comprises a substrate with two wave-guides embedded therein and an optical interconnect.

FIG. 6 comprises a substrate with two wave-guides, an optical interconnect, and an optical switch.

FIG. 7 comprises a substrate with a plurality of wave-guides, interconnects, and optical switches. FIG. 8 comprises a substrate with two wave-guides, optical interconnects, and optical interconnect, and conventional circuit technology.

FIG. 9 comprises a substrate with multiple wave-guides, interconnects, and conventional circuit technology.

BEST MODE FOR CARRYING OUT THE INVENTION

Referring now to FIG. 1a, a substrate assembly (10) can be seen depicted generally with a wave-guide (20) located within the substrate and tranversing the length of the substrate. The substrates may be constructed fo a standard epoxy-glass laminate (such as G 10/FR-4) or any other suitable material within or on which optical or other components may be embedded or mounted. The wave-guide may be an optical fiber, a fiber optics cable, or a light pipe, embedded within the substrate (FIG. 1b) and providing mechanical support to the substrate much like fiber glass reinforcement embedded within circuit boards, as well known in the art.

To provide a communication connection to the outside world and for purposes of transmitting an optical signal into the wave-guide (20) one surface of the substrate (21) is subject to a surface preparation, such as polishing, for purposes of establishing an optical connection between the wave-guide and other external devices providing a signal source or destination signal source. The communication may be in the form of an edge connector (23) (FIG. 1c) constructed to maintain the external optical cable (22) and the internal wave-guide (20) in intimate contact and in proper alignment. Proper alignment is automatically established through insertion of the substrate into the edge connector.

In one embodiment of the invention a second (opposite) surface (21) is subject to surface preparation. The second surface (21) may be used for test purposes to insure proper alignment of the wave-guide and connector or to provide access to the system by portable equipment.

Referring now to FIG. 2 is shown a method for transmitting the communication signal (30) from an optical transceiver source (24), connected to the wave-guide within the substrate (11), to an adjacent communication device (40). The adjacent communication device (40) may be a conventional data processing circuit board wherein a high speed data communication link exists through use of an LED or photo-optical receiver for transmitting or receiving the signal (30) from the adjacent substrate assembly (10).

In one embodiment of the invention the transceiver source (24) may be a physical extension of the wave-guide (25 in FIG. 3) that has been shortened and turned substantially ninety degrees within the substrate and which may protrude from the substrate in such a manner as to transmit and receive optical information to and from an optical transceiver on an adjacent board (40).

In another embodiment the transceiver source (24) may consist of an optical transmitting/receiving lens (25 in FIG. 4) connected to the wave-guide through use of an optical tap or a direct connection.

In another embodiment locational access to the wave-guide may be provided at a multiplicity of locations across the substrate by the structure shown in FIG. 5. FIG. 5 shows a method of providing a substrate-wide, two dimensional, area of access by embedding a second wave-guide (26) at substantially a right angle to the first wave-guide. The first wave-guide (20) and the second wave-guide (26) are then interconnected through the use of optical taps and an interconnecting wave-guide (27).

In a third embodiment (FIG. 6) a piezoelectric switch (28) is inserted into the first wave-guide and used to block or allow transmission of the optical signal upon application of an electrical signal. The piezoelectric switch allows for the selective routing of signals within a substrate system.

In a fourth embodiment (FIG. 7) a number of wave-guides (20) are embedded within the substrate and allowed to interface with the external edge-connector along the polished edge (21). A number of secondary wave-guides (26) are also embedded at substantially right angles to the first set of wave-guides. Interconnections are then made between the first set of wave-guides (20) and the second set of wave-guides (26) using taps and piezoelectric transducers. Use of the interconnects and the piezoelectric transducers allow for the routing of optical signals to and from any location within the substrate or to the external world.

In a fifth embodiment (FIG. 8) wave-guides are embedded in a substrate with such substrate also containing conventional surface mounted electrical data processing devices. In this embodiment the edge connector has been modified to contain electrical as well as optical connections. Also mounted on the substrate is at least one electro-optical converter (29) (optical component) for converting optical to electric signals and visa versa and through which signals are exchanged between the wave-guides and conventional electric data processing devices.

In a sixth embodiment (FIG. 9) is shown four wave-guides (two in each direction) (20 and 26) on the same substrate with conventional electrical data processing components. In this embodiment a first set of two wave-guides (20) are shown at substantially right angles a second set of two wave guides (26). It is apparent that many more wave-guides could be included in any given substrate. Piezoelectric data switches (28) are also shown at each wave-guide crossing point along with electro-optical converters (29) on each of the wave-guides. As is apparent this embodiment provides for high speed data transmission between any point within and without the substrate. Data entering the substrate (10) in the form of an optical signal transmitted along a wave-guide (20) is selectively switched to a CPU (50) where the data is consumed or conditioned through data manipulations within the CPU for other uses and either stored or re-transmitted to another CPU (51) within the substrate or re-transmitted to other devices external to the substrate through the use of the same or other wave-guides (20 and 26)) by operation of optical components mounted on the substrate.

I claim:

1. An apparatus providing communication resources within a substrate assembly, the apparatus having:
   A) a substrate;

B) a first set of at least one optical wave-guide embedded within the substrate with an optical connection at a first end of a wave-guide between the wave-guide and at least one electro-optical component mounted on such substrate; and C) at least one connector containing a means for connecting and automatically aligning a second end of the at least one wave-guide within the substrate with an at least one wave-guide external to the substrate to form a resultant optical connection with such resultant optical connection used for at least one-way transmission of an optical signal between the substrate and other, external, devices.

2. The apparatus in claim 1 wherein a second set of at least one optical wave-guide is embedded within the substrate at substantially right angles to the first set and interconnected to the first set through the use of optical taps such that a portion of the optical signal transmitted through a wave-guide in the first set is also transmitted through a wave-guide in the second set.

3. The apparatus of claim 1 wherein the optical signal within a wave-guide are selectively switched, conditioned , and, upon occasion re-transmitted within the same, or upon occasion, another wave-guide through the operation of optical components mounted on the substrate.

4. The apparatus of claim 1 wherein optical impulses within a wave-guide are selectively switchable by operation of an optical switch from the wave-guide and transmitted for consumption, or use, within at least one component.

5. The apparatus of claim 1 wherein optical signals enters and, upon occasion, leave the substrate assembly through a surface plane.

6. The apparatus of claim 1 wherein the substrate assembly contains at least one electro-optical device.

7. A method of providing communication resources within a substrate assembly having:

A) a substrate;

B) a first set of at least one optical wave-guide embedded within the substrate with an optical connection at a first end of a wave-guide between the wave-guide and at least one optical component mounted on the substrate; and C) at least one connector containing a means for connecting and automatically aligning a second end of the at least one wave-guide within the substrate with an at least one wave-guide external to the substrate with such resultant optical connection used for at least one-way transmission of data between the substrate and other, external, devices. the method comprising the steps of:

A) interconnecting at least one optical transducer to the wave-guide embedded within the substrate; and B) transmitting at least a one-way optical signal between external optical devices for use or re-transmission within devices located on the substrate.

8. The method of claim 7 wherein optical switches are installed in at least one location in such wave-guides thereby limiting signals to proper destinations.

9. The method in claim 7 wherein the substrate further includes a second set of at least one optical wave-guide embedded within the substrate at substantially right angles to the first set and interconnected to the first set through the use of optical taps such that a portion of the optical signal transmitted through a wave-guide in the first set is also transmitted through a wave-guide in the second set, the method further comprising the steps of:

transmitting at least a one-way optical signal between external optical devices to devices located at a plurality of two-dimensional locations on the substrate.

10. The method of claim 9 wherein optical switches are installed in at least one location in such wave-guides thereby limiting signals to proper destinations.

11. The method of claim 7 wherein optical signals are transmitted to optical components intrasubstrate through the use of embedded wave-guides.

* * * * *